(12) United States Patent
Yamaura

(10) Patent No.: US 11,316,411 B2
(45) Date of Patent: Apr. 26, 2022

(54) MOTOR

(71) Applicant: DENSO CORPORATION, Kariya (JP)

(72) Inventor: Kousuke Yamaura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/050,574

(22) PCT Filed: Jun. 18, 2019

(86) PCT No.: PCT/JP2019/024043
§ 371 (c)(1),
(2) Date: Oct. 26, 2020

(87) PCT Pub. No.: WO2019/244872
PCT Pub. Date: Dec. 26, 2019

(65) Prior Publication Data
US 2021/0057966 A1 Feb. 25, 2021

(30) Foreign Application Priority Data

Jun. 20, 2018 (JP) .............................. JP2018-117190

(51) Int. Cl.
*H02K 11/02* (2016.01)
*H02K 11/026* (2016.01)
*H02K 11/40* (2016.01)
*H01R 39/38* (2006.01)
*H02K 5/14* (2006.01)

(52) U.S. Cl.
CPC ......... *H02K 11/026* (2013.01); *H01R 39/385* (2013.01); *H02K 5/148* (2013.01); *H02K 11/40* (2016.01)

(58) Field of Classification Search
CPC ...... H02K 11/40; H02K 11/02; H02K 11/026; H02K 5/148
See application file for complete search history.

(56) References Cited

U.S. PATENT DOCUMENTS 10,110,100 B2 * 10/2018 Takamura .............. H02K 11/02
2016/0197538 A1 7/2016 Takamura et al.

* cited by examiner

*Primary Examiner* — Dang D Le
(74) *Attorney, Agent, or Firm* — Oliff PLC

(57) ABSTRACT

This motor includes a yoke, an armature, a brush holder and a ground member. The yoke has the shape of a bottomed cylinder that has an inner surface to which a magnet is affixed. The armature is contained within the yoke. The brush holder is arranged in an opening of the yoke, and holds a feed brush for supplying an electric current to the armature, and a bearing that axially supports a rotary shaft of the armature. The ground member is in contact with the bearing and the yoke. The ground member is affixed to a ground terminal that is held by the brush holder.

9 Claims, 5 Drawing Sheets

MOTOR

CROSS-REFERENCE TO RELATED APPLICATIONS

This application is based upon and claims the benefit of priority from prior Japanese Patent Application No. 2018-117190, filed on Jun. 20, 2018, the entire contents of which are incorporated herein by reference.

TECHNICAL FIELD

The present disclosure relates to a motor.

BACKGROUND ART

In the prior art, a motor includes a yoke to which a magnet is fixed, an armature accommodated in the yoke, and a brush holder arranged in an open portion of the yoke to hold a power supplying brush that supplies current to the armature and a bearing that supports a rotation shaft of the armature. In such a motor, when electrical noise is produced by sliding or the like of the power supplying brush on a commutator of the armature, the electrical noise propagates to the rotation shaft. However, a ground member, which is in contact with the yoke and the bearing supporting the rotation shaft, prevents the electrical noise from being emitted to the surrounding (refer to, for example, patent document 1).

PRIOR ART DOCUMENT

Patent Document

Patent Document 1: Japanese Patent No. 6051129

SUMMARY OF THE INVENTION

In a motor such as that described above, the ground member is connected in a structure that arranges the ground member between the yoke and a gear housing, which is fixed to the yoke, and fastens the ground member together with the yoke and the gear housing. Thus, when the ground member is fastened at an erroneous position, the fixed housing does not allow the contact state of the ground member to be checked.

It is an objective of the present disclosure to provide a motor that allows for satisfactory arrangement of a contact member that contacts a bearing and a yoke.

To achieve the above objective, a motor according to one embodiment of the present disclosure includes a yoke (14), an armature (15), a brush holder (16), and a ground member (33). The yoke is tubular and includes a closed bottom and an inner surface to which a magnet (13) is fixed. The armature is accommodated in the yoke. The brush holder is arranged in an open portion of the yoke to hold a power supplying brush (24) that supplies current to the armature and a bearing (26) that rotatably supports a rotation shaft (18) of the armature. The ground member (33) contacts the bearing and the yoke. The ground member is fixed to a ground terminal (32) held by the brush holder.

With the above structure, the ground member, which contacts the bearing and the yoke, is fixed to the ground terminal. Thus, the ground member can be checked to confirm that it is in a proper contact state when the brush holder is coupled to the yoke, for example, before coupling the gear housing or the like to the yoke. This allows for satisfactory arrangement of the ground member that contacts the bearing 26 and the yoke 14.

BRIEF DESCRIPTION OF THE DRAWINGS

The present disclosure, together with objects and advantages thereof, may best be understood by reference to the following description of the presently preferred embodiments together with the accompanying drawings in which.

MODES FOR CARRYING OUT THE INVENTION

A motor in accordance with one embodiment will now be described.

Figure 1:
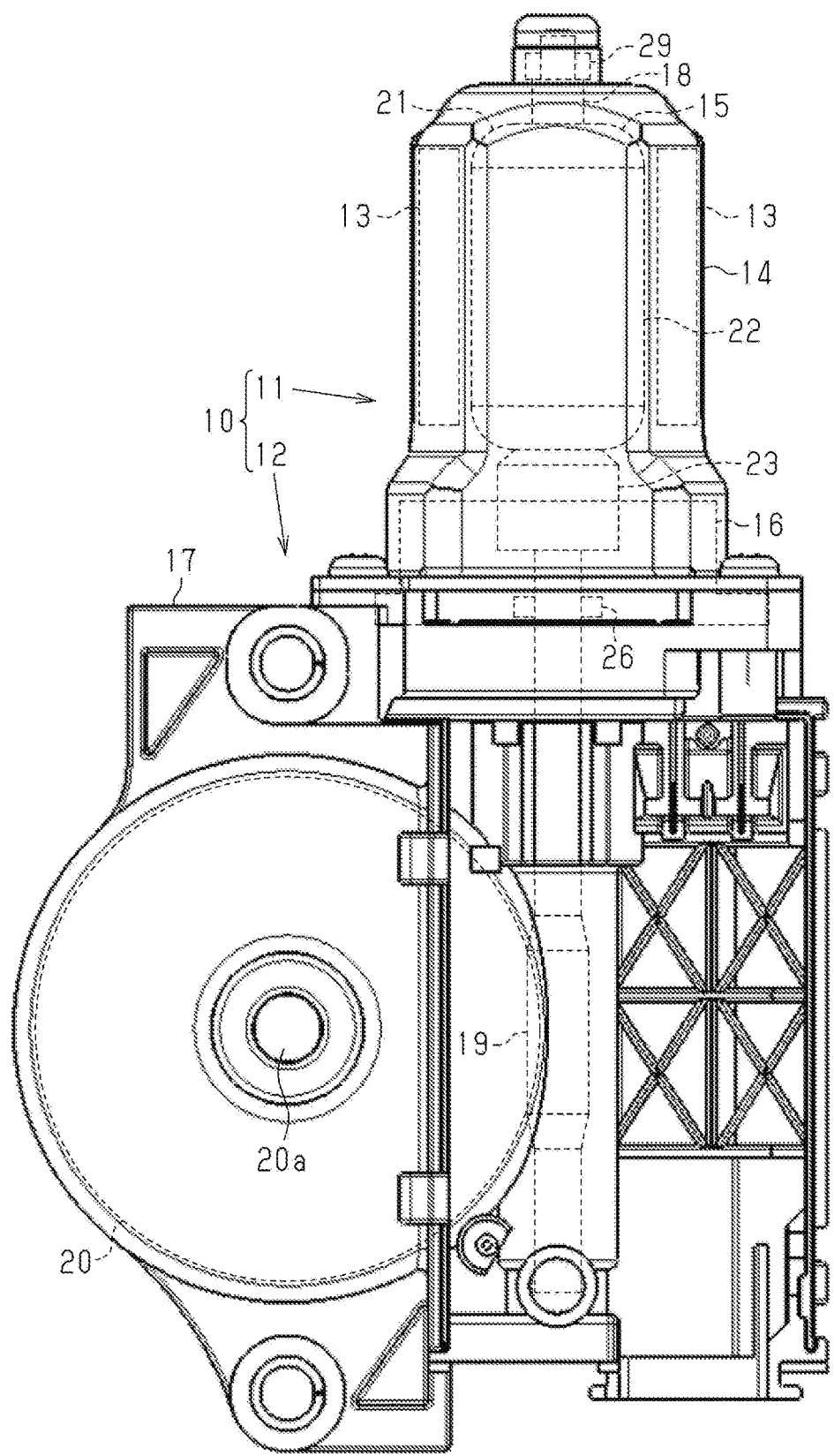
FIG. 1 is a plan view showing a motor in accordance with one embodiment.

As shown in FIG. 1, a motor 10 includes a motor body 11 and a reduction gear unit 12. The motor body 11 includes a yoke 14, which is tubular and includes a closed bottom and an inner surface to which magnets 13 are fixed, an armature 15, which is accommodated in the yoke 14, and a brush holder 16, which is formed from plastic and arranged in an open portion of the yoke 14. In a view taken in an axial direction, the yoke 14 of the present embodiment is of a flattened type and includes parallel planar portions and arced portions connecting the ends of the planar portions. The magnets 13 are fixed to the arced portions.

The reduction gear unit 12 includes a gear housing 17, which is fixed to the open portion of the yoke 14, a worm 19, which is accommodated in the gear housing 17 and rotated integrally with a rotation shaft 18 of the armature 15, a worm wheel 20, which is accommodated in the gear housing 17 and engaged with the worm 19, and an output shaft 20a, which is rotated integrally with the worm wheel 20.

The armature 15 includes the rotation shaft 18, an armature core 22, which is fitted to and fixed to the rotation shaft 18, and a rectifier 23, which is fitted to and fixed to the rotation shaft 18. A winding 21 is fitted to and fixed to the armature core 22.

Figure 2:
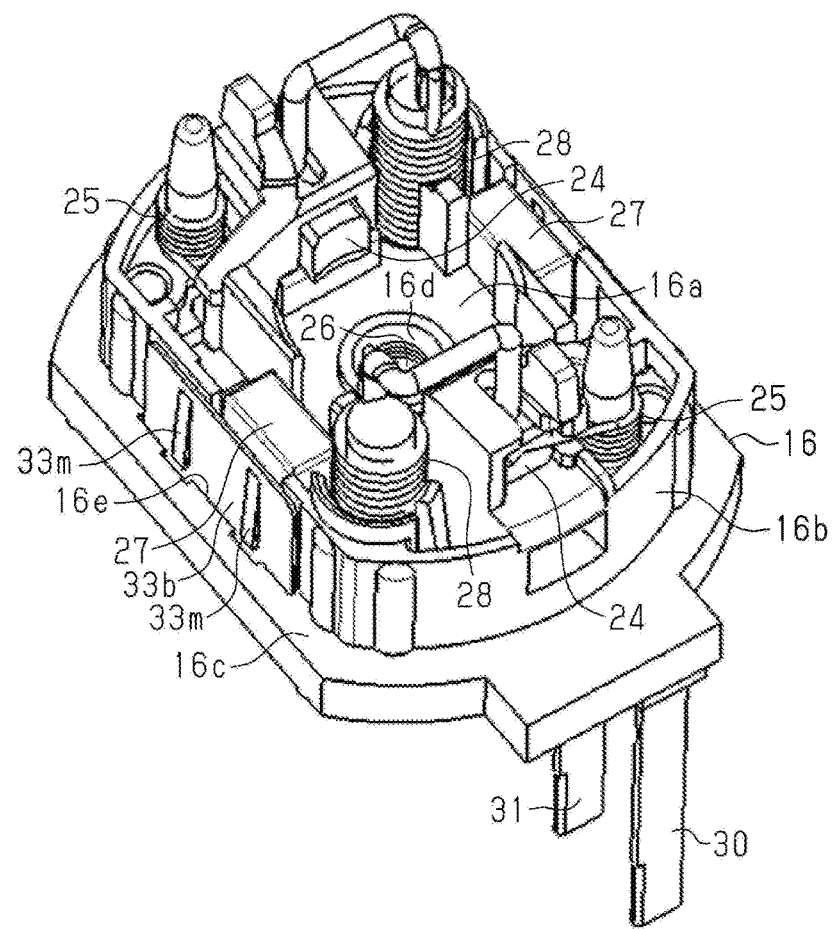
FIG. 2 is a perspective view showing a brush holder in accordance with one embodiment.

As shown in FIGS. 1 and 2, the brush holder 16 includes power supplying brushes 24, which supply the armature 15 (specifically, winding 21 via rectifier 23) with current, torsion coil springs 25, which urge the power supplying brushes 24 toward the rectifier 23, a bearing 26, which rotatably supports the rotation shaft 18, capacitors 27, which are for eliminating electrical noise, choke coils 28, and the like.

In detail, the brush holder 16 includes a plate-like base 16a, which closes the open portion of the yoke 14, a fitting-insertion wall 16b, which extends in the axial direction from the base 16a and is fitted and inserted into the yoke 14, and a flange 16c, which extends radially outward from the base 16a and contacts the open portion of the yoke 14 in the axial direction. The base 16a is shaped in correspondence with the yoke 14 as viewed in the axial direction and substantially rectangular as viewed in the axial direction. The base 16a includes arced longitudinal ends. The two power supplying brushes 24, the two torsion coil springs 25, the two capacitors 27, and the two choke coils 28 are held on the base 16a at the inner side of the fitting-insertion wall 16b. A bearing holder 16d extending through the center of the base 16a holds the bearing 26. The bearing 26 is paired with a coaxially arranged bearing 29, which is held at the bottom (upper end in FIG. 1) of the yoke 14, to rotatably support the rotation shaft 18 with the bearing 29.

Figure 3:
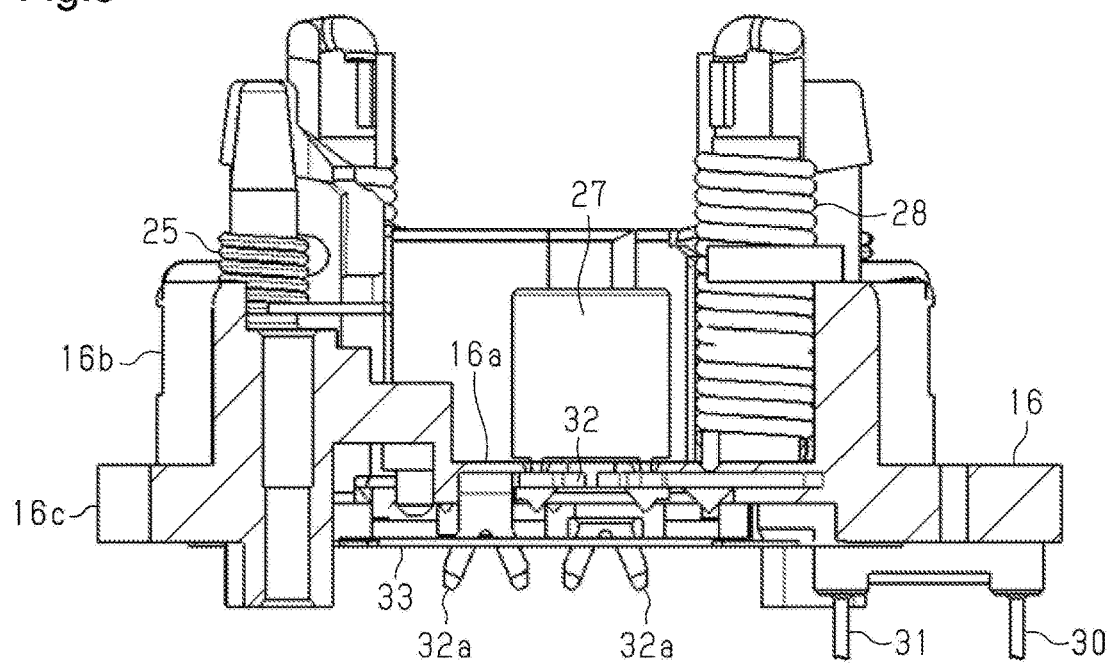
FIG. 3 is a partially cross-sectional view showing the brush holder in accordance with one embodiment.

As shown in FIG. 3, terminals 30 to 32 are insert-molded to the brush holder 16.

As shown in FIGS. 2 to 5, the brush holder 16 includes a ground member 33 that contacts the bearing 26 and the yoke 14. The ground member 33 is made of metal and is generally plate-like. The ground member 33 is fastened to the ground terminal 32, which is held by the brush holder 16.

In detail, the ground terminal 32 includes swaged portions 32a projecting in the axial direction from the outer surface of the yoke 14, that is, the bottom surface of the base 16a of the brush holder 16.

Figure 5:
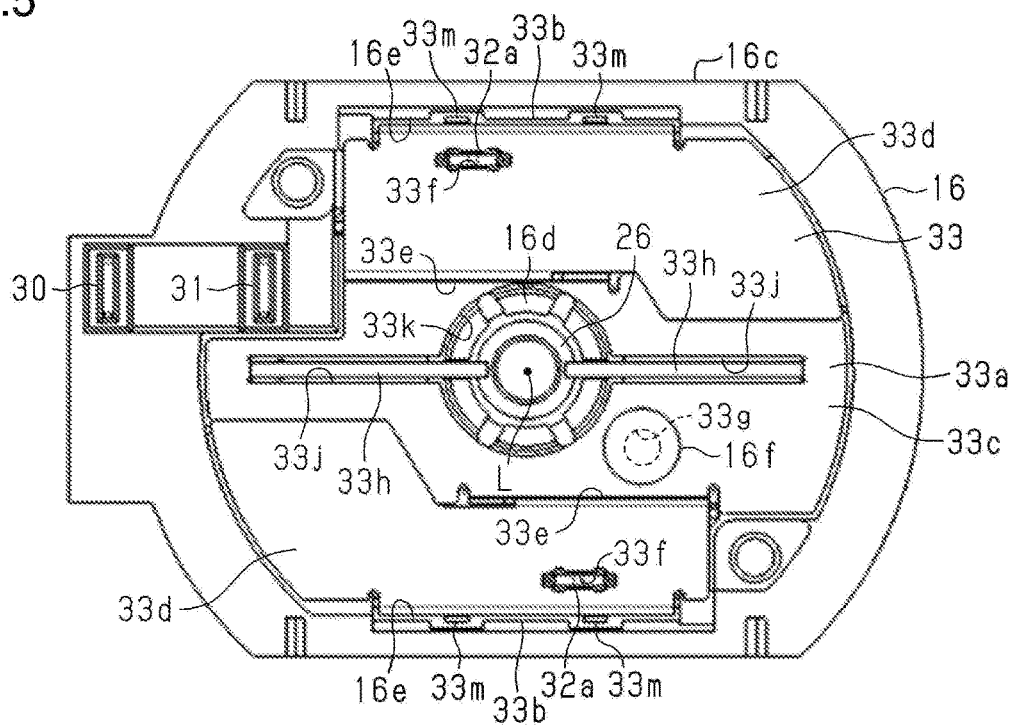
FIG. 5 is a bottom view showing the brush holder in accordance with one embodiment.

As shown in FIG. 5, the present embodiment includes two swaged portions 32a arranged on opposite sides of the axis center L (center of rotation shaft 18) at an interval of 180° about the axis center L. Each swaged portion 32a of the present embodiment is bifurcated and inserted through a hole and then plastically deformed to separate the bifurcated ends away from each other and swage (split-swage) the swaged portion 32a to the ground member 33.

The ground member 33 includes an axial shield 33a, which is plate-like and covers the bottom surface, or axial end surface, of the brush holder 16, and radial shields 33b, which cover the radial outer surfaces of the brush holder 16. The axial shield 33a of the present embodiment is formed in correspondence with the bottom surface of the brush holder 16. The axial shield 33a includes a central axial shield 33c, which corresponds to the central portion of the brush holder 16 with respect to a transverse direction, two end axial shield portions 33d, which correspond to the two sides of the brush holder 16 with respect to the transverse direction, and stepped portions 33e, which extend in the axial direction. The stepped portions 33e connect the central axial shield 33c to the two end axial shield portions 33d. The radial shields 33b of the present embodiment extend in the axial direction from the transverse direction ends of the axial shield 33a (i.e., the two end axial shield portions 33d) to cover transverse direction outer surfaces, which are the substantially flat surfaces of the fitting-insertion wall 16b of the brush holder 16. Insertion holes 16e extend through the flange 16c of the brush holder 16 at positions corresponding to the radial shields 33b. The radial shields 33b are shaped by merely bending the axial shield 33a at a right angle and are inserted through the insertion holes 16e for arrangement along the fitting-insertion wall 16b.

The axial shield 33a of the ground member 33, specifically, the two end axial shield portions 33d include connection fastening holes 33f at positions corresponding to the swaged portions 32a. The connection fastening holes 33f are shaped by parallel portions and arced portions connecting the ends of the parallel portions. The ground member 33 is fastened to the ground terminal 32 by the swaged portions 32a that are inserted through the connection fastening holes 33f and swaged.

Figure 7:
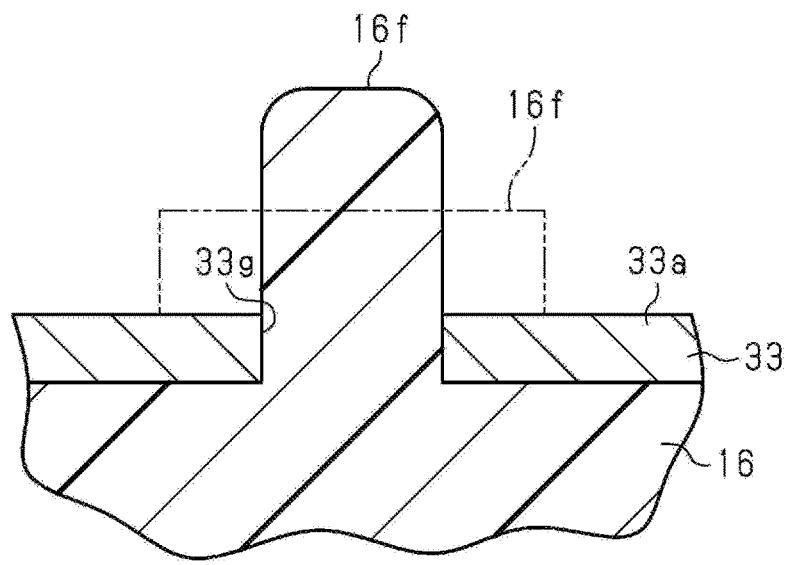
FIG. 7 is a cross-sectional view illustrating a positioning projection in accordance with one embodiment.

As shown in FIGS. 5 and 7, the brush holder 16 includes a positioning projection 16f on a surface opposed to the axial shield 33a.

Figure 6:
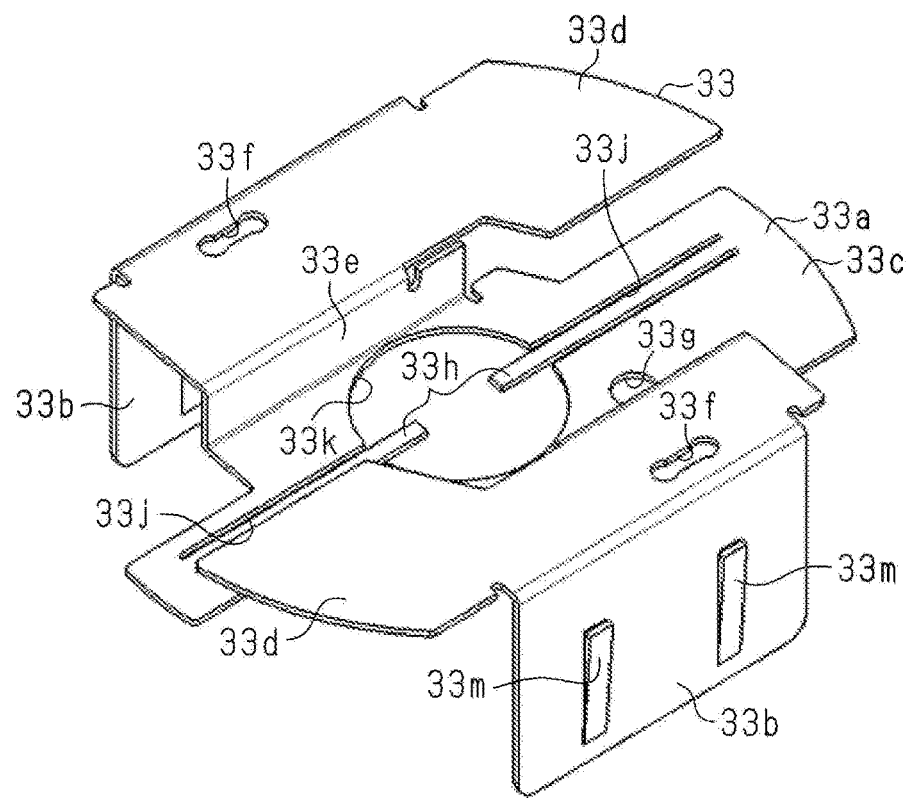
FIG. 6 is a perspective view showing a ground member in accordance with one embodiment.

As shown in FIGS. 5 to 7, the axial shield 33a includes a positioning hole 33g. The positioning projection 16f, which is inserted through the positioning hole 33g and swaged, fastens and the axial shield 33a to the brush holder 16 and positions the axial shield 33a in a direction orthogonal to the projecting direction of the positioning projection 16f. The swaging of the positioning projection 16f is thermal swaging. In FIG. 7, the solid lines show the positioning projection 16f in a state prior to thermal swaging, and the double-dashed lines show the positioning projection 16f in a state subsequent to thermal swaging.

Figure 4:
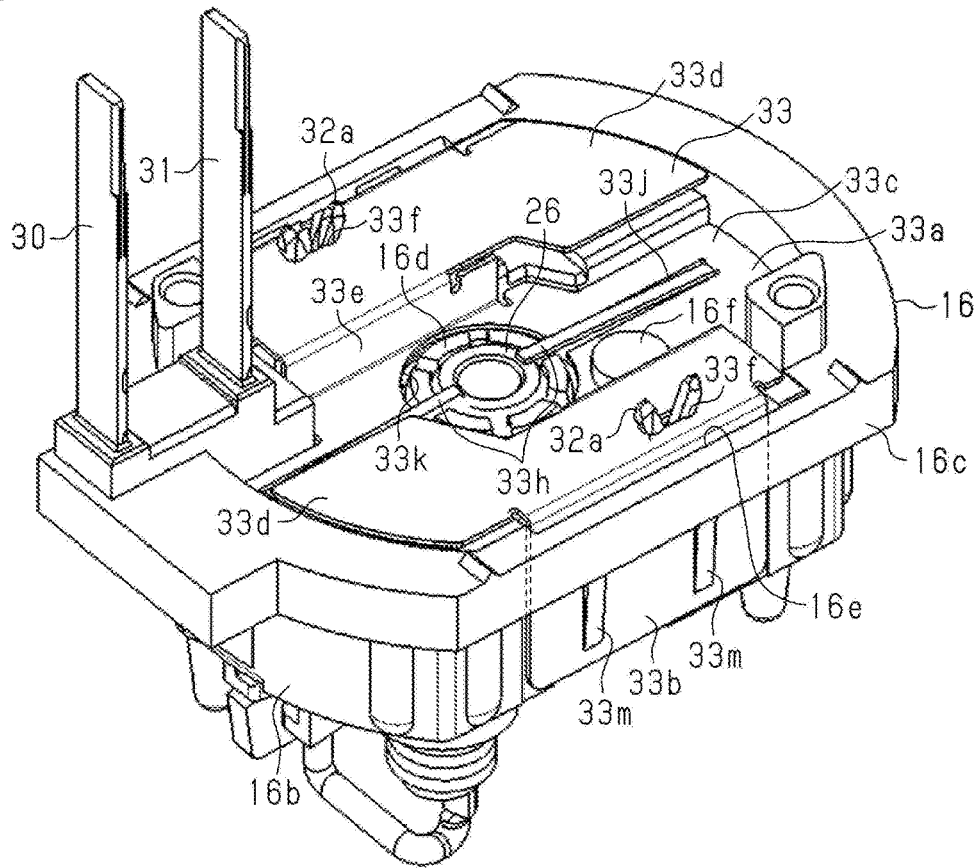
FIG. 4 is a perspective view showing the brush holder in accordance with one embodiment.

Further, as shown in FIGS. 4 to 6, the axial shield 33a includes two bearing contact pieces 33h that are pressed against the bearing 26. The bearing contact pieces 33h of the present embodiment are each arranged to form slits 33j at its two sides. More specifically, the central portion of the central axial shield 33c of the axial shield 33a includes a circular central hole 33k. The bearing contact pieces 33h have proximal ends arranged near the longitudinal ends of the central axial shield 33c and distal ends extending closer to the center axis than the edge of the central hole 33k. The slits 33j are formed at the two sides of each bearing contact piece 33h from the central hole 33k to the proximal end of the bearing contact piece 33h. The distal ends of the bearing contact pieces 33h are pressed against the axial end surface of the bearing 26 by the spring characteristics of the bearing contact pieces 33h. In the bottom surface of the base 16a of the brush holder 16, the bearing holder 16d includes holding pieces projecting from the bottom surface and arranged in the circumferential direction. The bearing contact pieces 33h are arranged in grooves extending between holding pieces as viewed in the axial direction and press the axial end surface of the bearing 26 while avoiding contact with the bearing holder 16d (i.e., holding pieces).

Figure 9:
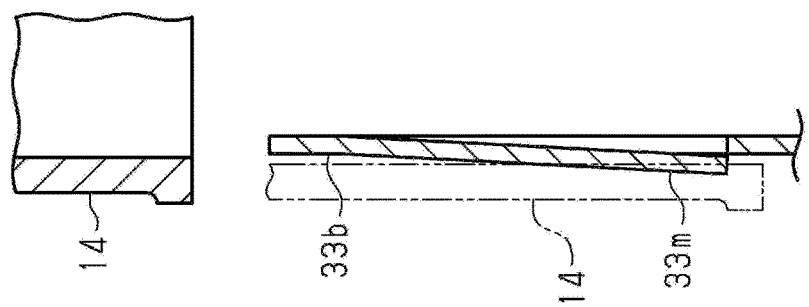
FIG. 9 is a cross-sectional view illustrating a yoke contact piece in accordance with one embodiment.
Figure 8:
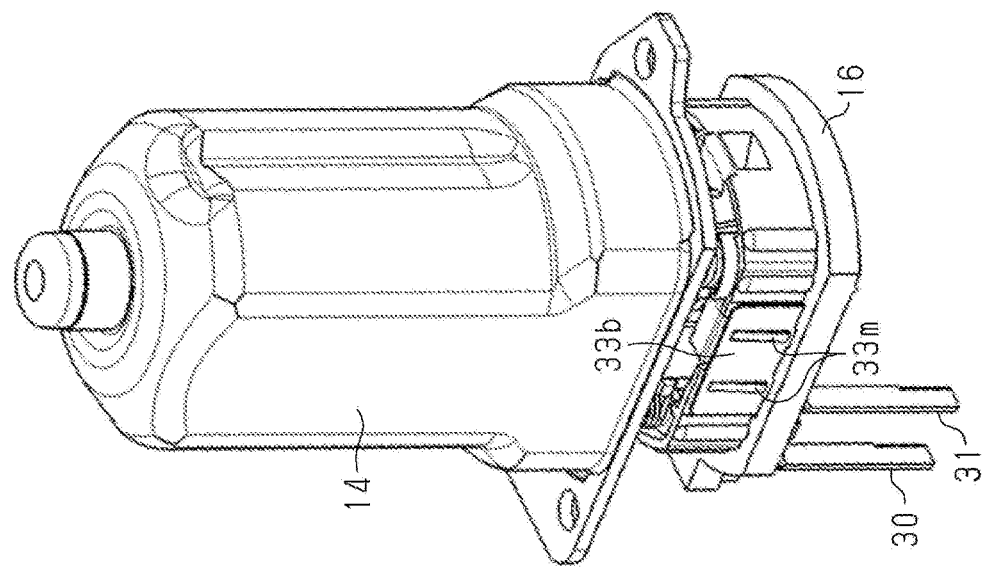
FIG. 8 is an exploded perspective view showing a yoke and the brush holder in accordance with one embodiment.

As shown in FIGS. 8 and 9, the radial shields 33b include yoke contact pieces 33m that are pressed against the inner surface of the yoke 14 when the brush holder 16 is inserted into and coupled to the yoke 14. The present embodiment includes two yoke contact pieces 33m for each radial shield 33b. Further, the yoke contact pieces 33m are inclined to extend radially outward (with respect to axial direction) in a direction opposite to the direction in which the yoke contact pieces 33m are inserted into the yoke 14 (downward in FIG. 9). In FIG. 9, the solid lines show the yoke 14 and the radial shield 33b, including the yoke contact piece 33m, in a state prior to coupling of the brush holder 16 to the yoke 14, and the double-dashed lines show the yoke 14 when the brush holder 16 is coupled to the yoke 14. When the brush holder 16 is coupled to the yoke 14, the yoke contact pieces 33m are inwardly bent by the inner surface of the yoke 14 and pressed against the inner surface by its spring characteristics. As a result, the ground member 33, which is fastened to the ground terminal 32, comes into contact with, or is electrically connected to, the bearing 26 and the yoke 14.

Figure 10:
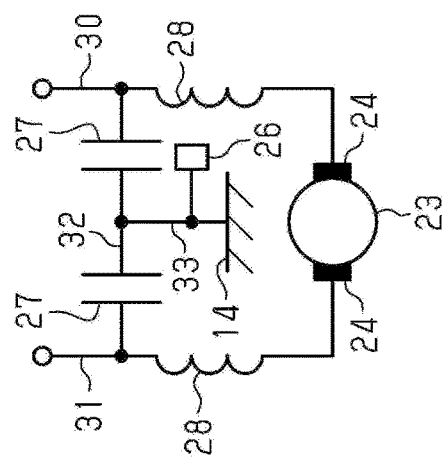
FIG. 10 is an electrical circuit diagram of the motor in accordance with one embodiment.

As shown in FIG. 10, in the motor 10 of the present embodiment, the terminals 30 and 31, which are connected to an external power supply, are connected to first terminals of the capacitors 27 and via the choke coils 28 to the power supplying brushes 24. Further, the capacitors 27 have second terminals, which are ground side terminals, connected to the ground terminal 32, and the ground terminal 32 is connected by the ground member 33 to the bearing 26 and the yoke 14, which serves as ground.

The operation of the motor 10 will now be described.

When the motor 10 is supplied with drive current, the current is supplied via the terminals 30 and 31, the choke coils 28, the power supplying brushes 24, and the rectifier 23 to the winding 21, and the attraction-repulsion forced produced by the magnets 13 rotates and drives the armature 15. Consequently, the rotation shaft 18 of the armature 15 rotates the worm 19. This rotates the worm wheel 20, which is engaged with the worm 19, and the output shaft 20a.

The power supplying brushes 24 slide on the rectifier 23 and generate electrical noise. However, the capacitors 27 and the choke coils 28 limit propagation of the electrical noise to circuits. Electrical noise is also propagated to the rotation shaft 18. However, the bearing 26, which rotatably supports the rotation shaft 18, is connected via the ground member 33 to the yoke 14, which serves as ground. This limits the emission of the electrical noise.

The advantages of the present embodiment will now be described.

(1) The ground member 33, which contacts the bearing 26 and the yoke 14, is fastened to the ground terminal 32, which is held by the brush holder 16. Thus, the ground member 33 can be checked to confirm that it is in a proper contact state when the brush holder 16 is coupled to the yoke 14, for example, before coupling the gear housing 17 or the like to the yoke 14. This allows for satisfactory arrangement of the ground member 33 that contacts the bearing 26 and the yoke 14. As a result, the propagation and emission of electrical noise are limited in a satisfactory manner.

(2) The ground terminal 32 is connected to the ground side terminals of the capacitors 27 to eliminate electrical noise. This effectively eliminates noise in the band of several hundred megahertz as a Y capacitor.

(3) The ground terminal 32 includes the swaged portions 32a, and the ground member 33 includes the connection fastening holes 33f. The ground terminal 32 is fastened by the swaged portions 32a, which are inserted through and swaged to the connection fastening holes 33f, to the ground terminal 32. Thus, without using for example, separate members, the ground member 33 and the ground terminal 32 are electrically connected, and the ground member 33 is fastened to the ground terminal 32.

(4) The ground member 33 includes the plate-like axial shield 33a, which covers the axial end surface of the brush holder 16, and the plate-like radial shields 33b, which cover the radial outer surfaces of the brush holder 16. This reduces the leakage of electrical nose in the axial direction and radial direction of the brush holder 16.

(5) The radial shields 33b include the yoke contact pieces 33m that are pressed against the inner surface of the yoke 14 when the brush holder 16 is coupled to the yoke 14. This allows for easy contact (i.e., electrical connection) of the ground member 33 with the yoke 14.

(6) The yoke contact pieces 33m are inclined to extend radially outward in the direction opposite to the direction in which the yoke contact pieces 33m are inserted into the yoke 14. Thus, the yoke contact pieces 33m have satisfactory coupling characteristics since they do not get caught when coupling the brush holder 16 to the yoke 14.

(7) The axial shield 33a includes the bearing contact pieces 33h that are pressed by the bearing 26. The slits 33j are formed at two sides of each bearing contact piece 33h. Thus, the bearing contact pieces 33h have sufficient lengths and can be bent for a sufficient amount thereby allowing the ground member 33 to easily contact the bearing 26 in a satisfactory manner and greatly increasing the axial shield 33a in area. For example, if slits were not to be formed at the two sides of a bearing contact piece, to obtain a sufficient length for the bearing contact piece so that the the bearing contact piece can be bent for a sufficient amount, the area of the axial shield and, consequently, the area of the axial end surface of the brush holder 16 will be decreased. This will lower the effect for reducing electrical noise that leaks in the axial direction. However, such a situation is avoided. If slits were not to be formed at the two sides of a bearing contact piece, to obtain sufficient area for the axial shield and sufficient area for covering the axial end surface of the brush holder 16, the following situation will occur. In this case, the length of the axial contact piece and its bending amount will be reduced. This will hinder with satisfactory pressing of the bearing contact piece against the bearing 26. However, such a situation is avoided.

(8) The brush holder 16 includes the positioning projection 16f on the surface opposed to the axial shield 33a, and the axial shield 33a includes the positioning hole 33g. The axial shield 33a is fastened to the brush holder 16 and positioned by the positioning projection 16f, which is inserted through the positioning hole 33g and swaged. Thus, the ground member 33 is further accurately and stably fastened to the brush holder 16. In a structure that simply fastens the ground member 33 to the ground terminal 32 held by the brush holder 16, the positioning of the ground member 33 relative to the brush holder 16 will be insufficient. With the above structure, such a situation can be avoided. Further, the fastening force of the ground member 33 is increased. This avoids separation of the ground member 33.

(9) The brush holder 16 includes the flange 16c, which extends radially outward to abut against the open portion of the yoke 14 in the axial direction. The flange 16c includes the insertion holes 16e through which the radial shields 33b are inserted. Thus, the ground member 33 does not have to be shaped to avoid the flange 16c, and the ground member 33 can have a simple shape.

The present embodiment can be modified as described below. The above embodiment and the modified examples described below may be combined as long as there is no technical contradiction.

In the above embodiment, the ground terminal 32, to which the ground member 33 is fastened, is connected to the ground side terminals of the capacitors 27 but does not have to be connected to the capacitors 27.

In the above embodiment, the ground terminal 32 includes the swaged portions 32a, and the ground member 33 is fastened to the ground terminal 32 by the swaged portions 32a inserted through the connection fastening holes 33f and swaged. However, there is no limitation to such a structure. For example, the ground member 33 may be fastened by a separate member such as solder. The swaged portions 32a of the above embodiment are bifurcated and undergo split swaging. However, there is no limitation to such a structure and swaging portions of other shapes may be employed. Further, there are two swaged portions 32a and two connection fastening holes 33f However, there may be one swaged portion 32a and one connection fastening hole 33f. Alternatively, there may be three or more swaged portions 32a and three or more connection fastening holes 33f.

In the above embodiment, the ground member 33 includes the plate-like axial shield 33a, which covers the axial end surface of the brush holder 16, and the plate-like radial shields 33b, which cover the radial outer surfaces of the brush holder 16. However, there is no limitation to such a structure. The ground member 33 may be less the axial shield 33a and the radial shields 33b. Alternatively, the ground member 33 may include only the axial shield 33a or only the radial shields 33b. Further, the axial shield 33a may be shaped not to include the stepped portions 33e.

In the above embodiment, the radial shields 33b include the yoke contact pieces 33m that are pressed against the inner surface of the yoke 14 when the brush holder 16 is coupled to the yoke 14. However, there is not limitation to such a structure. The yoke contact pieces 33m may be omitted from the radial shields 33b. Further, the yoke contact pieces 33m may be changed in number and shape.

In the above embodiment, the axial shield 33a includes the bearing contact pieces 33h that are pressed against the bearing 26, and the slits 33j are formed in two sides of each bearing contact piece 33h. However, there is no limitation to such a structure. For example, a bearing contact piece may be arranged without the slits 33j.

In the above embodiment, the brush holder 16 includes the positioning projection 16f, and the axial shield 33a includes the positioning hole 33g. The axial shield 33a is fastened to the brush holder 16 and positioned by the positioning projection 16f that is inserted through the positioning hole 33g and swaged. For example, the positioning projection 16f and the positioning hole 33g may be omitted. Further, the positioning projection 16f does not have to be swaged. More specifically, the positioning projection 16f may be fitted to the positioning hole 33g and used for only positioning.

In the above embodiment, the brush holder 16 includes the insertion holes 16e formed in the flange 16c. Instead, the insertion holes 16e may be omitted. In this case, for example, the ground member 33 has to be shaped to avoid the flange 16c.

In the above embodiment, the ground terminal 32 is insert-molded to the brush holder 16 but instead may be coupled and fastened to the brush holder 16.

In the above embodiment, the present disclosure is embodied in the motor 10 that includes the motor body 11 and the reduction gear unit 12. Instead, the present disclosure may be embodied in a motor that does not include the reduction gear unit 12. For example, the present disclosure may be embodied to a motor in which an end frame is connected to the open portion of the yoke 14 instead of the gear housing 17.

The present disclosure is illustrated through an embodiment. However, the present disclosure is not limited to the structure of the embodiment. The present disclosure includes various modified examples and modifications within the scope of equivalence. Additionally, various combinations and modes and one, more, or less of these elements in other combinations and forms are included in the range and conceptual scope of the present disclosure.

The invention claimed is:

1. A motor comprising:
   a yoke that is tubular and includes a closed bottom and an inner surface to which a magnet is fixed;
   an armature accommodated in the yoke;
   a brush holder arranged in an open portion of the yoke, the brush holder holding a power supplying brush that supplies current to the armature;
   a bearing that rotatably supports a rotation shaft of the armature; and
   a ground member that directly contacts the bearing and the yoke, wherein the ground member is interconnected and fixed to a ground terminal held by the brush holder.

2. The motor according to claim 1, wherein the ground terminal is connected to a ground side terminal of a capacitor for eliminating electrical noise.

3. The motor according to claim 1, wherein
   the ground terminal includes a swaged portion,
   the ground member includes a connection fastening hole, and
   the ground member is fixed to the ground terminal by the swaged portion that is inserted through the connection fastening hole and the swaged portion is swaged.

4. The motor according to claim 1, wherein the ground member includes
   a plate-shaped axial shield that covers an axial end surface of the brush holder, and
   a plate-shaped radial shield that covers a radial outer surface of the brush holder.

5. The motor according to claim 4, wherein the radial shield includes a yoke contact piece pressed against the inner surface of the yoke when the brush holder is coupled to the yoke.

6. The motor according to claim 5, wherein the yoke contact piece is inclined to extend radially outward in a direction opposite to a direction in which the yoke contact piece is inserted into the yoke.

7. The motor according to claim 4, wherein
   the axial shield includes a bearing contact piece pressed against the bearing, and
   the bearing contact piece includes slits that are formed at two sides of the bearing contact piece.

8. The motor according to claim 4, wherein
   the brush holder includes a positioning projection on a surface opposed to the axial shield,
   the axial shield includes a positioning hole, and
   the axial shield is positioned and fastened to the brush holder by the positioning projection inserted through the positioning hole and the positioning projection is swaged.

9. The motor according to claim 4, wherein
   the brush holder includes a flange that extends radially outward to abut against the open portion of the yoke in an axial direction, and
   the flange includes a through hole through which the radial shield extends.

* * * * *